United States Patent
Speckbacher et al.

(10) Patent No.: US 7,312,878 B2
(45) Date of Patent: Dec. 25, 2007

(54) METHOD FOR MANUFACTURING A SCALE, A SCALE MANUFACTURED ACCORDING TO THE METHOD AND A POSITION MEASURING DEVICE

(75) Inventors: Peter Speckbacher, Kirchweidach (DE); Georg Flatscher, Schneizlreuth (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 352 days.

(21) Appl. No.: 10/491,931

(22) PCT Filed: Sep. 24, 2002

(86) PCT No.: PCT/EP02/10669

§ 371 (c)(1),
(2), (4) Date: Oct. 4, 2004

(87) PCT Pub. No.: WO03/034105

PCT Pub. Date: Apr. 24, 2003

(65) Prior Publication Data

US 2005/0052743 A1   Mar. 10, 2005

(30) Foreign Application Priority Data

Oct. 11, 2001 (DE) ............................... 101 50 099

(51) Int. Cl.
G02B 5/18 (2006.01)
G01B 11/14 (2006.01)
(52) U.S. Cl. ...................... 356/614; 359/572
(58) Field of Classification Search .. 250/492.1–492.2; 257/797; 356/399–401, 614
See application file for complete search history.

(56) References Cited

U.S. PATENT DOCUMENTS 4,155,735 A * 5/1979 Ernsberger ..................... 430/5

(Continued)

FOREIGN PATENT DOCUMENTS

EP          0 160 784          11/1985

(Continued)

OTHER PUBLICATIONS

M. Peuker, "Optimum energy for high resolution low voltage electron beam lithography—Monte Carlo simulations and experiments", Microelectronic Engineering, , Bd. 53, Nr. 1-4, Jun. 2000, pp. 337-340.

(Continued)

Primary Examiner—Gregory J. Toatley, Jr.
Assistant Examiner—Jarreas Underwood
(74) Attorney, Agent, or Firm—Kenyon & Kenyon LLP

(57) ABSTRACT

In a method for producing a scale in the form of a phase grating, the scale itself, and a position measuring device including the scale, the scale includes two reflection layers located at a distance from one another on either side of a spacer layer. The production of the scale includes the following steps: provision of a first reflection layer, which is unbroken over its entire surface and fulfils the relationship $A=R/\eta \geq 3$, where R represents the degree of reflection and $\eta$ represents the backscatter coefficient for electrons; application of the spacer layer to the first reflection layer; application of the second reflection layer to the spacer layer; and structuring of the second reflection layer by an electron beam lithography process.

20 Claims, 4 Drawing Sheets

U.S. PATENT DOCUMENTS

| | | | |
|---|---|---|---|
| 4,286,871 A * | 9/1981 | Erickson | 355/133 |
| 4,522,862 A | 6/1985 | Bayer et al. | |
| 4,708,437 A * | 11/1987 | Kraus | 359/572 |
| 4,885,231 A * | 12/1989 | Chan | 430/321 |
| 5,323,266 A * | 6/1994 | Flint et al. | 359/566 |
| 5,377,044 A | 12/1994 | Tomono et al. | |
| 5,786,931 A * | 7/1998 | Speckbacher et al. | 359/572 |
| 5,880,882 A * | 3/1999 | Michel et al. | 359/436 |
| 5,978,127 A * | 11/1999 | Berg | 359/279 |
| 6,020,269 A * | 2/2000 | Wang et al. | 438/717 |
| 6,605,828 B1 * | 8/2003 | Schwarzrock et al. | 257/81 |
| 6,611,377 B1 * | 8/2003 | Chung | 359/572 |
| 6,671,092 B2 * | 12/2003 | Flatscher | 359/436 |
| 6,748,138 B2 * | 6/2004 | Wang et al. | 385/37 |
| 7,065,035 B1 * | 6/2006 | Mizuuchi et al. | 369/283 |
| 2004/0051881 A1 | 3/2004 | Holzapfel et al. | |
| 2004/0086802 A1 * | 5/2004 | Gibson | 430/270.13 |

FOREIGN PATENT DOCUMENTS

| | | |
|---|---|---|
| EP | 0 742 455 | 11/1996 |
| EP | 742455 A1 * | 11/1996 |
| EP | 0 773 458 | 5/1997 |
| EP | 0 481 356 | 4/2004 |
| WO | WO 02/23131 | 3/2002 |

OTHER PUBLICATIONS

Hambach, Dirk, "Nanostrukturen mit hohem Aspektverhältnis als lichtstarke diffraktive Röntgenoptiken für hohe Beugungsordnungen," ("Nanostructures Having a High Aspect Ratio as High-Aperture Diffractive X-Ray Optics for High Diffraction Orders"), Cucillier Verlag (Publisher), Göttingen, (2001); pp. 71-87.

Peuker, Markus, "Elektronenstrahllithographie und Nanostrukturübertragung zur Herstellung von hochauflösenden diffraktiven Röntgen optiken aus Nickel," ("High Resolution Electron Beam Lithography"), Cucillier Verlag (Publisher), Göttingen, (2000), Chapter 4, pp. 55-89.

* cited by examiner

METHOD FOR MANUFACTURING A SCALE, A SCALE MANUFACTURED ACCORDING TO THE METHOD AND A POSITION MEASURING DEVICE

FIELD OF THE INVENTION

The present invention relates to a method for manufacturing a scale in the form an incident-light phase grating for a photoelectric position measuring device, to a scale and to a position measuring device.

BACKGROUND INFORMATION

An incident-light phase grating may be used in a photoelectric position measuring device for measuring the relative position of two objects that are movable in relation to one another. The incident-light phase grating should have a high diffraction efficiency and thus the highest possible reflectance of the reflector layers therein, so that the measurement signal is as large as possible in relation to the noise signals in the corresponding position measuring devices.

European Published Patent Application No. 0 160 784 by the applicant hereof describes a phase grating composed of two reflective layers spaced a distance apart, situated on both sides of a transparent spacer layer, with at least one reflective layer being designed as an amplitude grating. In one exemplary embodiment, a reflective layer is a continuous layer. In the publication cited above, chromium and gold are proposed as conventional materials for the reflective layers.

The incident-light phase grating described in European Published Patent Application No. 0 742 455 by the applicant hereof also discloses chromium or gold as the material for the reflective layers. In addition, it is pointed out there that the corresponding incident-light phase grating can also be manufactured by electron-beam lithography.

European Published Patent Application No. 0 773 458 by the applicant hereof mentions the use of gold, silver, copper or aluminum as materials for the reflective layers in conjunction with conventional photolithographic methods.

Because of the steady increase in requirements pertaining to the resolution, i.e., measurement accuracy of such scales designed as incident-light phase gratings, it has become necessary to further reduce the periodic graduations or structures of these incident-light phase gratings. In certain industrial fields, it is even possible to replace complex laser beam interferometry with position measuring devices using incident-light phase grating with suitably finely structured graduations.

However, there are physical limits to the photolithography methods with regard to the fineness of the structures to be manufactured. The reason therefor is diffraction effects during exposure of the photoresist.

These unwanted diffraction effects are minimized in the manufacture of such scales designed as incident-light phase gratings by the electron-beam lithography method, but a satisfactorily fine and sharp graduation cannot be produced using conventional materials such as gold for the reflective layers.

SUMMARY

It is an aspect of the present invention to provide a method for the manufacture of a scale in the form of an incident-light phase grating having a very fine graduation and good optical properties.

The foregoing may be achieved by providing a method as described herein, by providing a scale as described herein and by providing a position measuring device as described herein.

An example embodiment of the present invention may provide the possibility of manufacturing incident-light phase gratings having a very fine graduation and at the same time a high diffraction efficiency, i.e., a high reflectance.

The high-resolution incident-light phase gratings may be manufactured using electron-beam lithography in manufacturing of incident-light phase grating in combination with a suitable design of a bottom reflector layer. An important point in the manufacture of the incident-light phase gratings is the choice of material for the bottom reflector layer. In the past, attention was devoted only to the fact that these materials should have a good reflectance and may optionally also have a suitable hardness and good adhesion properties.

Reflectance expresses the ratio of reflected light energy to light energy incident on the reflective layer. Consequently, reflectance may reach a maximum value of 1, i.e., 100%. Values are given below at a wavelength from the range from 250 nm and 1600 nm, e.g., 670 nm. The angle of incidence of light is 0° for the determination of reflectance, i.e., it is perpendicular, i.e., orthogonal to the plane of the reflector.

Because of the requirements of the reflective layers discussed above, gold has been the material predominantly used for the bottom reflector layer. However, limits are encountered with respect to the fineness of graduations that are manufacturable when gold and chromium are used as the bottom reflector layer in combination with electron-beam lithography. The reason for this is the backscatter electrons which impinge on the photoresist from the rear in structuring, so that the fine graduation quality manufactured in this manner may not be adequate. However, incident-light phase gratings having a graduation of less than 3 μm are manufacturable by selecting materials having suitable backscatter coefficients.

The backscatter coefficient is understood to refer to the ratio of backscatter electrons to primary electrons when the electrons impinge on a solid body, in this case the incident-light phase grating to be manufactured. The backscatter coefficient of a layer of a certain material having a given thickness is measured at an angle of incidence perpendicular to the surface of the specimen, the measurement being performed at an acceleration voltage of 20 kV. The electrons are released by thermionic emission, for example, before being accelerated.

Thus for the manufacture of a suitable incident-light phase grating having a very fine graduation, the bottom reflector layer should have suitable reflection properties in operation of the position measuring device and should also have a low backscatter coefficient for manufacture by electron-beam lithography.

According to an example embodiment of the present invention, a method for manufacturing a scale for a photoelectric position measuring device in the form of a phase grating, having two reflective layers arranged a distance apart on either side of a spacer layer, includes: producing a first reflective layer as a continuous layer over an entire surface, which satisfies the condition $A=R/\eta \geq 3$, in which R represents an energy-based reflectance for light at a wavelength in a range from 250 nm to 1600 nm impinging perpendicularly on the first reflective layer, and $\eta$ represents a backscatter coefficient for electrons that are accelerated using a voltage of 20 kV after being released and that impinge on the first reflective layer at a right angle; applying the spacer layer to the first reflective layer; applying a second reflective layer to the spacer layer; and structuring the second reflective layer using an electron-beam lithography process.

According to an example embodiment of the present invention, a scale in the form of a phase grating includes: a first reflective layer; a second reflective layer; and a spacer layer, the first reflective layer and the second reflective layer spaced a distance apart and arranged on either side of the spacer layer. The first reflective layer is configured as a continuous layer over an entire surface and satisfies the condition $A = R/\eta \geq 3$, in which R represents an energy-based reflectance for light at a wavelength in a range of 250 nm to 1600 nm and impinging perpendicularly on the first reflective layer, and $\eta$ represents a backscatter coefficient for electrons, which after being released are accelerated using a voltage of 20 kV and impinge on the first reflective layer perpendicularly.

According to an example embodiment of the present invention, a position measuring device includes: a light source; and a scale arranged as a phase grating. The scale includes: a first reflective layer; a second reflective layer; and a spacer, the first reflective layer and the second reflective layer spaced a distance apart and arranged on either side of the spacer. The light source illuminates the scale, and the first reflective layer is arranged as a continuous layer over an entire surface and satisfies the condition $A = R/\eta \geq 3$, in which R represents an energy-based reflectance of the first reflected layer for light from the light source, and $\eta$ represents a backscatter coefficient for electrons, which after being released are accelerated using a voltage of 20 kV and impinge on the first reflective layer perpendicularly.

Additional details and aspects of the method, the incident-light phase grating and the position measuring device according to example embodiments of the present invention are set forth in the following description with reference to the appended Figures.

DETAILED DESCRIPTION

Figure 1A:
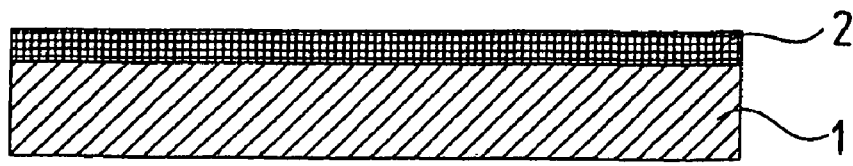
FIGS. 1a through 1d illustrate method steps on the basis of cross-sections through an incident-light phase grating according to an example embodiment of the present invention.

According to FIG. 1a, first a 100 nm thick bottom reflector layer 2 is applied by vacuum sputtering to a carrier substrate of aged Zerodur. Bottom reflector layer 2 is applied over the entire surface, i.e., without periodic interruptions, in the area of its surface which is illuminable during operation.

The material for carrier substrate 1 is selected to have the greatest possible stability with respect to both mechanical and thermal stresses. In particular, aged Zerodur which has a thermal expansion coefficient of almost zero may be particularly suitable for this purpose. However, quartz glass, other optical glasses, steel such as Invar and ceramics or silicon may also be considered as alternative carrier substrate materials. Stability with respect to possible temperature-induced changes in volume or length may be important in particular when the incident-light phase grating according to an example embodiment of the present invention is used in position measuring devices for high-precision determination of the relative positions of two objects.

Aluminum alloyed with 2% chromium to increase its layer hardness and scratch resistance is used as the material for bottom reflector layer 2. Bottom reflector layer 2 designed in this manner has a reflectance of 75% with a backscatter coefficient of 8%. This yields a ratio A equal to 9.38 of reflectance R to backscatter coefficient $\eta$.

Figure 1B:
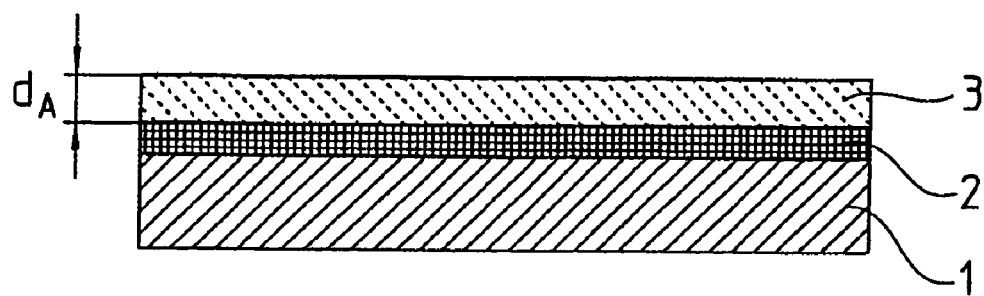

As shown in FIG. 1b, a 120-nm-thick spacer layer 3 is then applied to bottom reflector layer 2. A sputtering process is used here again. In the example shown here, spacer layer 3 is made of $SiO_2$. One deciding factor in the choice of materials may be that spacer layer 3 may be substantially transparent with respect to the incident radiation in the subsequent operation of the incident-light phase grating. With a suitable choice of thickness $d_A$ of spacer layer 3, the desired resulting phase shift of the reflected partial beam bundle may be adjusted in a defined manner. Layer thickness $d_A$ is optimized with respect to the particular requirements through suitable numerical methods.

Figure 1C:
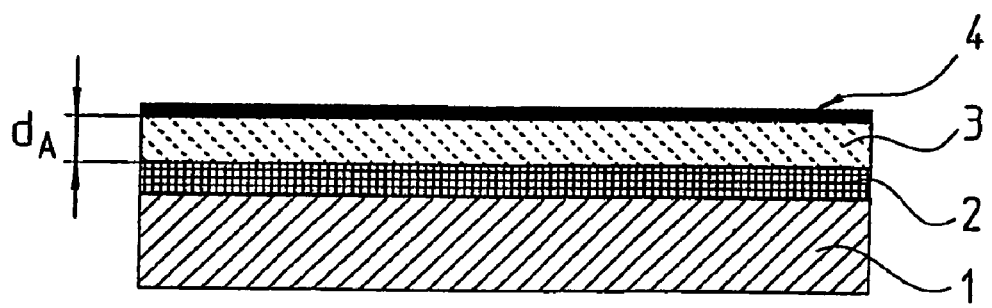

In the next step according to FIG. 1c a 35-nm thick second reflective layer 4 of chromium is applied to spacer layer 3 by the sputtering method. Pure chromium is not generally used here and instead chromium with nitrogen incorporated to reduce the layer tension. As an alternative, other materials such as nickel, aluminum, copper, silver, etc. may also be used.

Figure 1D:
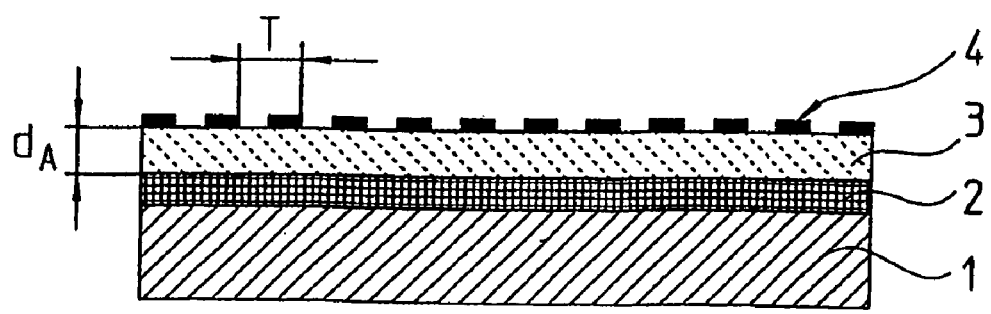

As shown in FIG. 1d, second reflective layer 4 is then structured to yield a periodic graduation with a spacing T of approximately 2048 nm. Since the graduation is made up of lines and gaps of approximately equal widths, the line width here is 1024 nm. A conventional electron-beam lithography process may be used for the structuring, whereby an acceleration voltage of 20 kV is applied in conjunction with a thermionic emission. Due to the high electric conductivity of aluminum as the material for bottom reflector layer 2, charges that occur in the layers due to the electron bombardment are effectively transported out of the layer structure. This effect may be advantageous for the course of the structuring process because no appreciable charge clouds are built up in the layer structure. Therefore, the structuring rate may be set very high and the process ultimately may also result in sharp-edged structuring of the photoresist.

Due to the electron-beam lithography in combination with a sufficiently thick bottom reflector layer 2 made up substantially of aluminum, it is possible to manufacture high-quality incident-light phase grating scales. Quality is expressed in the quality of the graduation as well as in the reflection properties and/or the diffraction efficiency of the scale. As an alternative to aluminum, however, other materials may also be used successfully for bottom reflector layer 2 in the electron-beam lithography process. For example, copper and silver may be potentially used successfully for bottom reflector layer 2 having a suitable layer thickness. The table given below shows a selection of such alternative materials which are characterized in that the numerical value for ratio A is at least 3. The numerical values shown in the table are determined for a thickness of bottom reflector layer 2 of 120 nm at an acceleration voltage of 20 kV and a light wavelength of 670 nm with an angle of incidence of 0° in each case.

| Material for bottom reflector layer 2 | η | R | A = R/η | Quality of graduation for use in a high-resolution position measuring device |
|---|---|---|---|---|
| Al | 8% | 75% | 9.38 | Suitable |
| Cu | 16% | 92% | 5.75 | Suitable |
| Ag | 21% | 95% | 4.52 | Suitable |
| Cr | 15% | 40% | 2.67 | Unsuitable |
| Ti | 14% | 35% | 2.50 | Unsuitable |
| Au | 40% | 90% | 2.25 | Unsuitable |
| Cr (sputtered) | 15% | 28% | 1.87 | Unsuitable |

The materials for bottom reflector layer 2 which are listed as "suitable" in the table above also have a low susceptibility to soiling. In this context, susceptibility to soiling refers to impurities that may occur on the scales due to layers of soiling, e.g., liquid films. Due to the improved layer structure, an increased quality of the scale is also discernible in this regard.

Figure 2:
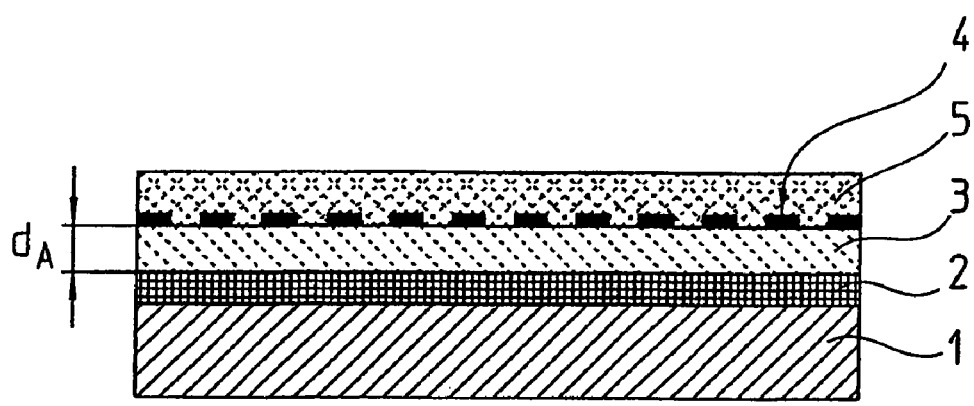
FIG. 2 shows an example embodiment of an incident-light phase grating according to the present invention having a protective layer.

FIG. 2 shows an example of the method according to the present invention, i.e., the incident-light phase grating according to an example embodiment of the present invention. A transparent protective layer 5 is designed here as a sol-gel layer. As an alternative, protective layer 5 may also be a spin-on-glass layer. A function of protective layer 5 is to protect second reflective layer 4 from external influences, e.g., of a mechanical or chemical origin.

Figure 3:
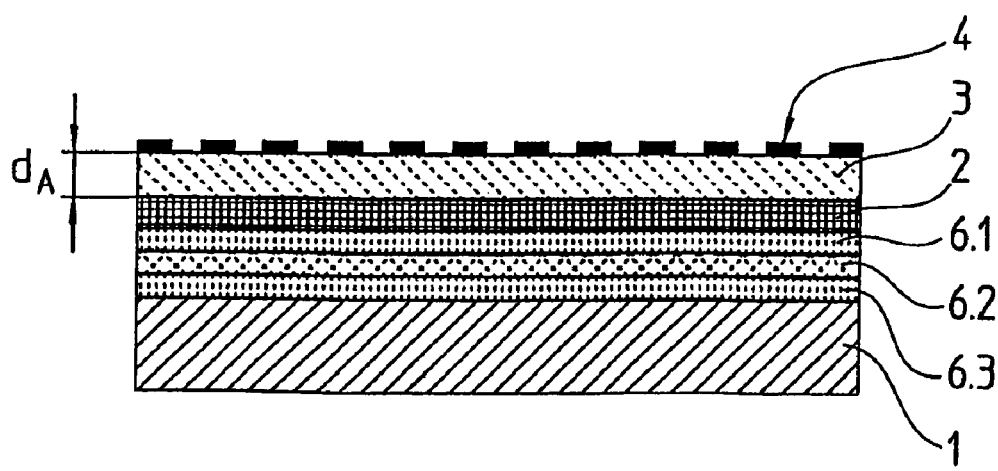
FIG. 3 shows an example embodiment of an incident-light phase grating according to the present invention having an additional layer.

An example embodiment is shown in FIG. 3, in which an additional layer 6 is shown applied to carrier substrate 1 by sputtering and then bottom reflector layer 2 is applied to this by an additional sputtering process. Additional layer 6 is composed of three individual layers 6.1, 6.2, 6.3. First and third additional layers 6.1 and 6.3 are made of $SiO_2$ but second additional layer 6.2 is made of aluminum. Additional layer 6 additionally reduces the backscattered electrons in the subsequent electron-beam lithography process and also reduces the flexural stresses in the finished scale. With respect to the reduction in backscattered electrons, the materials that are used in additional layer 6 may have a comparatively low average atomic number and a relatively small thickness. The mean atomic number is the mean of the atomic numbers of the atoms of a substance or a substance mixture, weighted according to their percentage amount in the total material. Additional layer 6 need not be in multiple layers but may also be a single layer. In addition to the materials mentioned above, additional layer 6 may also be made of diamond or diamond-like coatings.

In addition, an example embodiment of the present invention provides a scale structure in which a carrier substrate 1 is omitted entirely. For example, bottom reflector layer 2 may be designed to be thick enough to function as a carrier body. Bottom reflector layer 2 may then be made of a polished aluminum strip, if necessary.

Figure 4A:
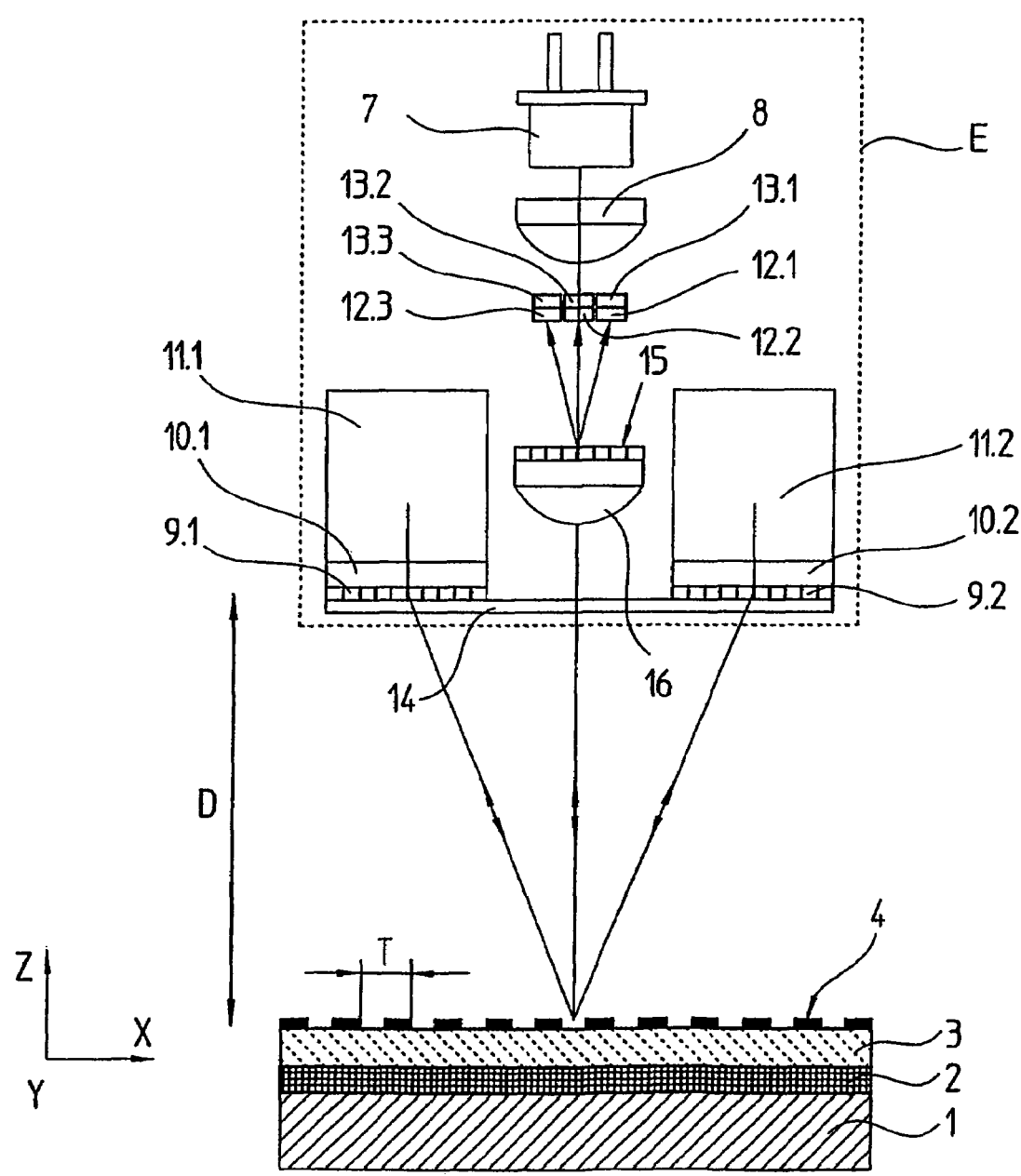
FIG. 4a is a front view an example embodiment of a position measuring device according to the present invention.
Figure 4B:
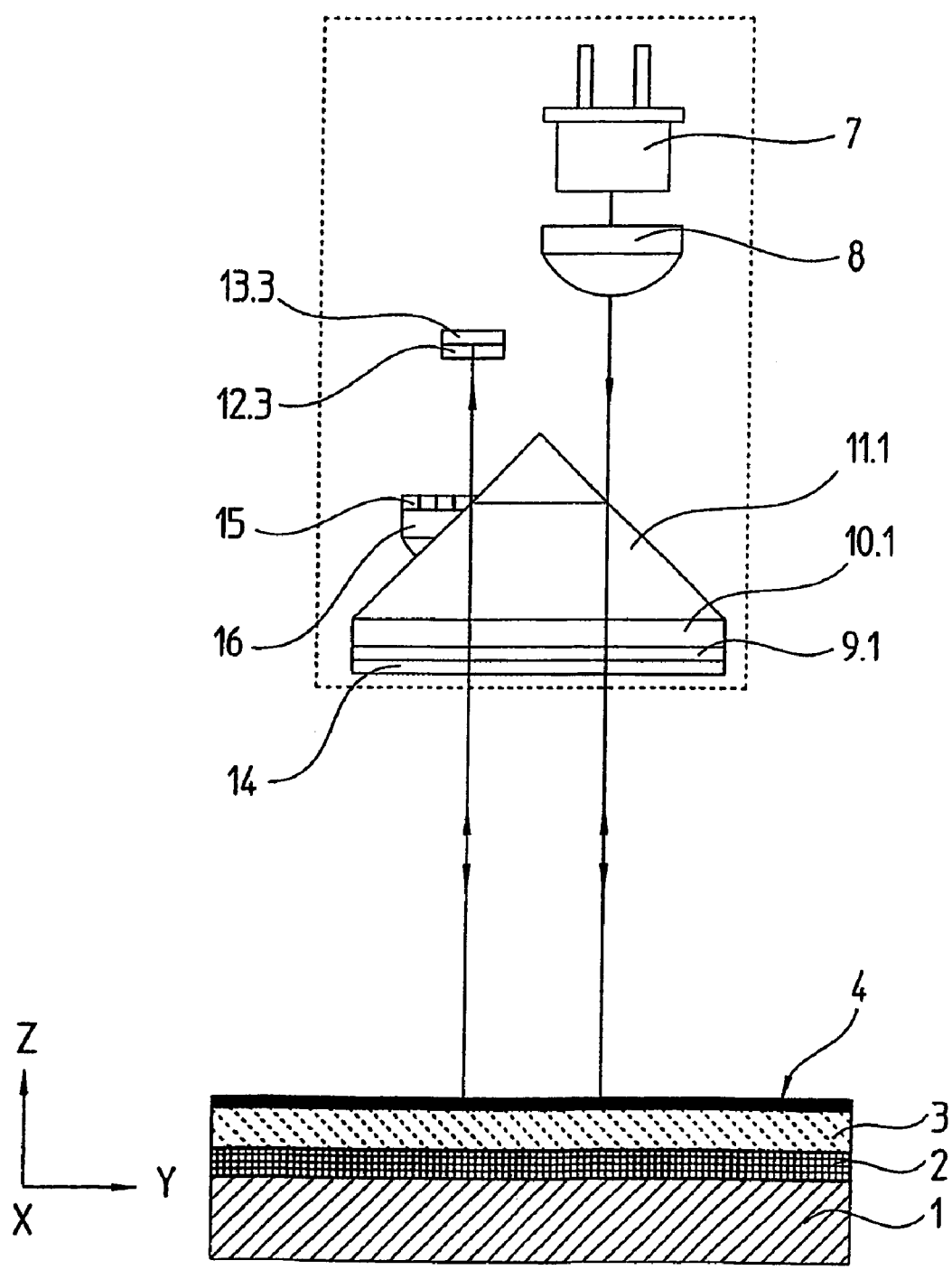
FIG. 4b is a side view of an example embodiment of a position measuring device according to the present invention.

FIGS. 4a and 4b depict schematically elements of a position measuring device having the scale described above and a four-grating sensor in front and side views respectively. In this connection, reference should also be made to the disclosure content of patent application PCT/EP01/10373 by the applicant. The illumination is provided, e.g., via a light source 7 at λ=780 nm, the light source being designed as a laser diode, having a downstream collimation lens 8.

However, this wavelength is not essential for such position measuring equipment. Light sources 7 emitting light of a wavelength from the range of 250 nm to 1600 nm may be suitable for this use. The lens of sampling unit E is made up of sampling gratings 9.1, 9.2, λ/8 layer 10.1, 10.2, ridge prisms 11.1, 11.2 made of glass, as well as polarizers 12.1, 12.2, 12.3 and photoelements 13.1, 13.2 and 13.3 for signal generating.

The scale in the form of an incident-light phase grating has a spacing T of 2048 nm. At a distance D=15 mm from the scale, there are two ridge prisms 11.1, 11.2, each being designed as 90° prisms, having sampling gratings 9.1, 9.2 in the form of transmission gratings having a phase graduation featuring the same spacing of 2048 nm, applied to the bottom sides of the prisms, i.e., the sides facing the scale. The two ridge prisms 11.1, 11.2 and sampling gratings 9.1, 9.2 may be attached to a common carrier plate 14, for example. In the present exemplary embodiment, the two ridge prisms 11.1, 11.2 are situated a distance apart in measurement direction x.

As an alternative to the exemplary embodiment depicted here, a single ridge prism 11.1, 11.2 having sampling gratings 9.1, 9.2 featuring boreholes or recesses for beam input and output may also be used. The combination of ridge prisms 11.1, 11.2 and sampling gratings 9.1, 9.2 is also referred to below as a deflector element.

If a collimated light bundle emitted by light source 7 strikes the scale perpendicularly and centrally between the arrangement of ridge prisms 11.1, 11.2, this results in two +/− first diffraction orders which are deflected back to the lower side of ridge prisms 11.1, 11.2 after being reflected the first time. The beam bundles are directed straight at the prisms, i.e., at a right angle to the scale by diffraction on sampling gratings 9.1, 9.2, before entering ridge prisms 11.1, 11.2 and the subsequent passage through same. Ridge prisms 11.1, 11.2 deflect the partial beams in the z and y directions and thereby create an offset in the y direction. As the beam bundle passes through the deflection elements, in addition to passing through sampling gratings 9.1, 9.2, light also passes through λ/8 layers 10.1, 10.2 twice. Because of the orientation of least one ridge prism 11.1, 11.2 parallel to measurement direction x, ridge prism 11.1, 11.2 acts as a retroreflector in direction y. This direction y is perpendicular to measurement direction x in the plane of the scale. After emerging from ridge prisms 11.1, 11.2, beam bundles are generated by repeated diffraction on sampling grating 9.1, 9.2, propagating back to the scale where they are superimposed. The interfering beam bundle is deflected back by the second reflection, i.e., diffraction on the scale in the direction z, i.e., in the direction of the detector elements, and strikes a system made up of collimator lens 16 and splitting grating 15. Three partial beam bundles are formed at splitting grating 15. A signal may be generated from these three beam bundles in a conventional manner via polarizers 12.1, 12.2, 12.3 through which the partial beam bundles pass before striking photoelements 13.1, 13.2, 13.3 on which phase-shifted signals then result. In conjunction with splitting grating 15, reference is made to European Published Patent Application No. 0 481 356 by the applicant hereof.

What is claimed is:

1. A method for manufacturing a scale for a photoelectric position measuring device in the form of a phase grating, having two reflective layers arranged a distance apart on either side of a spacer layer, comprising:

producing a first reflective layer as a continuous layer over an entire surface, which satisfies the condition A=R/η≧3, in which R represents an energy-based reflectance for light at a wavelength in a range from 250 nm to 1600 nm impinging perpendicularly on the first reflective layer, and η represents a backscatter coefficient for electrons that are accelerated using a voltage of 20 kV after being released and that impinge on the first reflective layer at a right angle;
applying the spacer layer to the first reflective layer;
applying a second reflective layer to the spacer layer; and
structuring the second reflective layer using an electron-beam lithography process.

2. The method according to claim 1, wherein the producing step includes applying the first reflective layer to a carrier substrate.

3. The method according to claim 1, wherein the producing step includes applying the first reflective layer to a layer of a material having an average atomic number of less than 30 and a density of less than 5 kg/dm$^3$.

4. The method according to claim 1, wherein the first reflective layer has a thickness of at least 35 nm.

5. The method according to claim 1, further comprising applying a transparent layer to the second reflective layer.

6. The method according to claim 1, wherein the first reflective layer includes one of (a) more than 80 wt % of one of (i) aluminum, (ii) copper and (iii) silver and (b) more than 80 wt % of a mixture of at least two of (i) aluminum, (ii) copper and (iii) silver.

7. The method according to claim 1, wherein the second reflective layer includes more than 80 wt % chromium.

8. A scale in the form of a phase grating, comprising:
a first reflective layer;
a second reflective layer; and
a spacer layer, the first reflective layer and the second reflective layer spaced a distance apart and arranged on either side of the spacer layer;
wherein the first reflective layer is configured as a continuous layer over an entire surface and satisfies the condition A=R/η≧3, in which R represents an energy-based reflectance for light at a wavelength in a range of 250 nm to 1600 nm and impinging perpendicularly on the first reflective layer, and η represents a backscatter coefficient for electrons, which after being released are accelerated using a voltage of 20 kV and impinge on the first reflective layer perpendicularly.

9. The scale according to claim 8, wherein the second reflective layer has a periodic structure having a spacing of less than 3 µm.

10. The scale according to claim 8, wherein the second reflective layer includes chromium.

11. The scale according to claim 8, wherein the first reflective layer has a thickness of at least 35 nm.

12. The scale according to claim 8, wherein the first reflective layer includes one of (a) more than 80 wt % of one of (i) aluminum, (ii) copper and (iii) silver and (b) more than 80 wt % of a mixture of at least two of (i) aluminum, (ii) copper and (iii) silver.

13. The scale according to claim 8, wherein the first reflective layer is arranged on a layer.

14. The scale according to claim 13, wherein the first reflective layer is arranged on a layer of material having an atomic number of less than 30 and a density of less than 5 kg/dm$^3$.

15. A position measuring device, comprising:
a light source; and
a scale arranged as a phase grating, the scale including:
a first reflective layer;
a second reflective layer; and
a spacer, the first reflective layer and the second reflective layer spaced a distance apart and arranged on either side of the spacer;
wherein the light source illuminates the scale, and the first reflective layer is arranged as a continuous layer over an entire surface and satisfies the condition A=R/η≧3, in which R represents is an energy-based reflectance of the first reflected layer for light from the light source, and η represents a backscatter coefficient for electrons, which after being released are accelerated using a voltage of 20 kV and impinge on the first reflective layer perpendicularly.

16. The method according to claim 1, wherein the backscatter coefficient is dependent on a thickness of the first reflective layer.

17. The method according to claim 1, wherein the second reflective layer is structured in the structuring to include a periodic structure having a spacing of less than 3 µm.

18. The scale according to claim 8, wherein the backscatter coefficient is dependent on a thickness of the first reflective layer.

19. The position measuring device according to claim 15, wherein the backscatter coefficient is dependent on a thickness of the first reflective layer.

20. The position measuring device according to claim 15, wherein the second reflective layer has a periodic structure having a spacing of less than 3 µm.

* * * * *